UNITED STATES PATENT OFFICE.

THILO KROEBER, OF BASEL, SWITZERLAND, ASSIGNOR TO THE FIRM OF SOCIETY OF CHEMICAL INDUSTRY IN BASLE, OF BASEL, SWITZERLAND.

MONOAZO DYE AND PROCESS OF MAKING SAME.

No. 844,814.

Specification of Letters Patent.

Patented Feb. 19, 1907.

Application filed December 5, 1906. Serial No. 346,488. (Specimens.)

*To all whom it may concern:*

Be it known that I, THILO KROEBER, chemist and doctor of philosophy, a subject of the Duke of Saxe-Altenburg, and a resident of Basel, Switzerland, have invented new and useful Improvements in the Manufacture of Monoazo Dyestuffs, of which the following is a clear and complete specification.

According to the present invention the nitroamido-alpha-naphtholsulfonic acid which can be obtained by reducing naphthol yellow S (OH: $NO_2$: $NO_2$: $SO_3H$ = 1:2:4:6 or 7) in neutral or alkaline solution with iron or alkali sulfid is diazotized and combined with azo components to produce monoazo dyestuffs which are valuable both in direct dyeing and for development by subsequent chroming.

The manufacture of the new nitroamido-alpha-naphtholsulfonic acid may be carried out, for example, as follows: Three hundred and fifty kilos of sodium dinitronaphtholsulfonate (naphthol yellow S) are dissolved in about two thousand liters of water, and seven hundred kilos of iron-powder are added. While energetically stirring, the solution is heated at about from 50° to 70° centigrade during about six hours—that is to say, until the naphthol yellow has disappeared. Now the mixture, which shows a bluish-red coloration, is filtered, and the filtrate after being cooled down at ordinary temperature is acidified by means of hydrochloric acid until to a strong acid reaction on Congo paper. The nitroamido-naphtholsulfonic acid is precipitated as a yellowish crystalline mass, which is freed from mother-liquor by suction. The new nitroamido-naphtholsulfonic acid corresponds probably to the 4-nitro-2-amido-1-naphthol-6 or 7-sulfonic acid. The reduction may also be proceeded in alkaline solution with alkali sulfid or the like in the well-known manner.

The manufacture of the new dyestuffs from this nitroamido-alpha-naphtholsulfonic acid may be illustrated by the following examples:

Example I: 28.5 kilos of nitroamido-alpha-naphtholsulfonic acid obtained by reducing naphthol yellow S, as above described, are dissolved in water, with addition of six kilos of sodium carbonate and diazotized in the cold with twenty-five kilos of hydrochloric acid and seven kilos of sodium nitrite, whereupon the diazo compound separates as yellow crystals. The diazo compound thus obtained is introduced into an aqueous solution of seventeen kilos of sodium beta-naphthol mixed with thirty-five kilos of sodium carbonate. The mass is stirred for some hours at the ordinary temperature, then heated to 50° centigrade and allowed to cool, whereupon the dyestuff separates as green crystals having a metallic luster. It dyes wool in an acid-bath directly black shades. By subsequently treating the dyeings with chromium salts a deep brownish black is obtained.

Example II: The diazo mass obtained from 28.5 kilos of nitroamido-alpha-naphtholsulfonic acid according to Example I is combined with twenty-six kilos of sodium 1:5-naphtholsulfonate in a solution made alkaline with sodium carbonate. The combination begins immediately. After stirring for several hours the separated dyestuff without preliminary heating is directly filtered, pressed, and dried. It forms a bronze-powder easily soluble in water to a violet-blue solution and dyes wool in an acid-bath beautiful blue-black shades, which pass to a deep fast black when subsequently chromed.

Example III: The aforesaid quantity of nitrodiazo-alpha-naptholsulfonic acid is combined with 14.5 kilos of 1:5-dioxynapthalene (oxynaphthol 1:5) in a solution made alkaline with sodium carbonate. A dyestuff is obtained which dissolves in hot water to a blue-black solution, passing to yellow brown on addition of acid. It dyes wool directly beautiful blue shades, which when subsequently chromed pass to extremely fast black shades.

The corresponding dyestuff from 1:6-dioxynapthalene dyes wool in an acid-bath violet-black shades, which pass toward brown when subsequently chromed.

In analogous manner dyestuffs may be made by any other azo-coloring-matter component.

What I claim is—

1. The process for the manufacture of monoazo dyestuffs, which consists in preparing a nitroamido-alpha-naphtholsulfonic acid by reduction of naphthol yellow S, diazotizing the so-obtained nitroamido-alpha-naphtholsulfonic acid and combining the resulting nitrodiazo-alpha-naphtholsulfonic acid with an azo-coloring-matter component, as described.

2. The process for the manufacture of monoazo dyestuffs, which consists in diazotizing the nitroamido-alpha-naphtholsulfonic acid obtainable by reduction of the naphthol yellow S and combining the resulting nitrodiazo-alpha-naphtholsulfonic acid with a naphtholic compound, as described.

3. The process for the manufacture of a monoazo dyestuff, which consists in diazotizing the nitroamido-alpha-naphtholsulfonic acid obtainable by reduction of the naphthol yellow S and combining the resulting nitrodiazo-alpha-naphtholsulfonic acid with beta-naphthol, as described.

4. An improvement in the manufacture of monoazo dyestuffs, which consists in preparing a nitro-amido-alpha-naphtholsulfonic acid by reducing naphthol yellow S as above described.

5. As new products the monoazo dyestuffs derived from the diazo derivative of the nitroamido-alpha-naphtholsulfonic acid obtainable by reduction of naphthol yellow S, which dyestuffs dissolve in water with bluish black and in concentrated sulfuric acid with violet-blue to blue colorations and which dye unmordanted wool in blue-black tints, which tints become on treatment with chromium compounds deep black.

6. As a new product, the monoazo dyestuff derived from nitrodiazo-alpha-naphtholsulfonic acid obtainable by reduction of naphthol yellow S and from beta-naphthol, which coloring-matter yields a bluish-black aqueous solution turning to violet on addition of ammonia liquor, dissolves in concentrated sulfuric acid with violet-blue coloration and dyes unmordanted wool in blue-black shades, which shades become deep brownish black on treatment with chromium compounds.

In witness whereof I have hereunto signed my name, this 17th day of November, 1906, in the presence of two subscribing witnesses.

THILO KROEBER.

Witnesses:
   GEO. GIFFORD,
   AMAND RITTER.